United States Patent [19]

Deady

[11] Patent Number: 4,473,200

[45] Date of Patent: Sep. 25, 1984

[54] STORES HANDLING APPARATUS AND SYSTEM

[75] Inventor: Martin A. Deady, East Lambrook, England

[73] Assignee: Westland plc, Yeovil, England

[21] Appl. No.: 214,875

[22] Filed: Dec. 10, 1980

[30] Foreign Application Priority Data

Dec. 20, 1979 [GB] United Kingdom ............... 7943174

[51] Int. Cl.³ .............................................. B64F 1/00
[52] U.S. Cl. .................... 244/116; 104/242; 114/261; 244/137 R; 414/430
[58] Field of Search ............... 414/10, 589, 590, 430, 414/140; 89/1.5 R; 114/261, 262; 244/115, 116, 137 R, 137 A; 180/14 C; 280/411 A, 411 B, 79.1, 79.2; 410/7, 8, 84, 104, 105, 113; 104/139, 242, 245, 246, 247, 275; 188/41, 43, 44

[56] References Cited

U.S. PATENT DOCUMENTS

| 1,486,355 | 3/1924 | Murray | 104/242 X |
| 3,338,440 | 8/1967 | Donahue | 414/430 |
| 3,373,711 | 3/1968 | Bader | 114/262 |
| 3,640,490 | 2/1972 | Baekken | 244/116 |
| 3,749,266 | 7/1973 | Gordon | 414/430 |
| 3,859,925 | 1/1975 | Hartz | 104/139 X |
| 4,275,983 | 6/1981 | Bergman | 414/676 |

FOREIGN PATENT DOCUMENTS

| 438131 | 7/1948 | Italy | 89/1.5 R |
| 28856 | 8/1912 | United Kingdom | 104/247 |

Primary Examiner—Leslie J. Paperner
Attorney, Agent, or Firm—Larson and Taylor

[57] ABSTRACT

A stores handling apparatus for moving and positioning stores relative a parked aircraft to facilitate loading thereof comprises a beam member (21) having releasable coupling means (22) near each end for attachment of at least one stores carrying trolley (23) and so that each trolley projects substantially parallel to the beam member. Means such as rollers (24) or wheels (33) provide for movement of the beam member along a surface, and guide means (25) are adapted in operation for engagement with guide means (39) formed in a trackway (38) on the surface.

In operation, the stores handling apparatus is used in combination with an aircraft moving apparatus operable to align an aircraft on the trackway and, preferably, of a type comprising a trolley (50) movable along the same trackway.

The apparatus and system of this invention is particularly suited for use in the moving and positioning of stores relative an aircraft parked on the deck of a ship.

20 Claims, 12 Drawing Figures

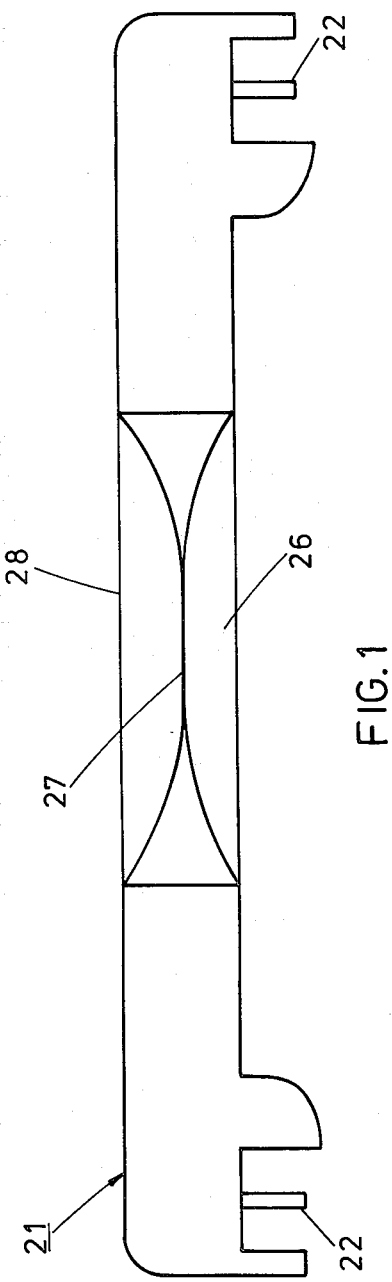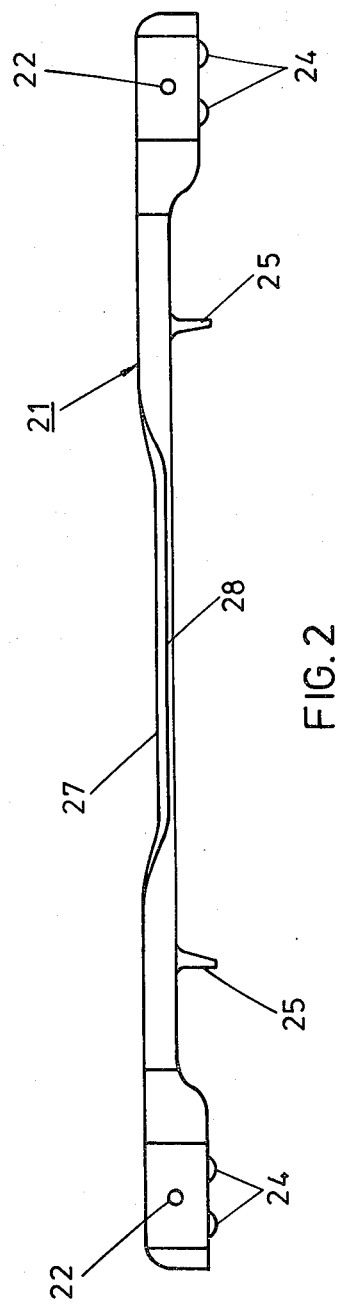

STORES HANDLING APPARATUS AND SYSTEM

DESCRIPTION OF INVENTION

This invention relates to apparatus and to a system for moving and positioning weapons and other stores relative to an aircraft on which such weapons and stores are to be externally mounted, and is particularly concerned with moving and positioning weapons or other stores relative to an aircraft on the deck of a ship. Such weapons and stores will hereinafter be collectively referred to as stores.

The movement and positioning of stores relative to an aircraft, such as a helicopter, on the deck of a ship which is operating in rough seas, is a hazardous task due to difficulties in accurately positioning the store beneath a device such as an ejector release unit on which it is to be mounted.

Accordingly, in its broadest aspect the invention provides stores handling apparatus comprising a beam member, coupling means near to each end of the beam member for attachment of at least one stores carrying trolley whereby each said trolley projects substantially perpendicular to said beam member, means for supporting said beam member on a surface and whereby said beam member may be moved over said surface, and guide means projecting from said beam member and adapted in operation for engagement with guide means on a surface over which said apparatus is to be moved.

In another aspect, the invention provides stores handling apparatus for moving and positioning stores relative an aircraft parked on the deck of a ship comprising a trackway on the deck, a beam member located transversely of the trackway, means for moving said beam member along the trackway, releasable coupling means adjacent each end of the beam member for the attachment of at least one stores carrying trolley whereby each said trolley projects substantially perpendicular to the beam member, and guide means adapted in operation to guide the beam member along the trackway.

In yet another aspect the invention provides a stores handling system for moving and positioning stores relative an aircraft parked on the deck of a ship comprising stores handling apparatus and aircraft moving apparatus, the aircraft moving apparatus being adapted during operation to align the aircraft so that a longitudinal centreline thereof is parallel to a trackway on the deck, the stores handling apparatus comprising a beam member located transversely of the trackway, means for moving the beam member along the trackway, releasable coupling means adjacent each end of the beam member for the attachment of at least one stores carrying trolley whereby each trolley projects substantially perpendicular to the beam member, and guide means adapted in operation to guide the beam member along the trackway.

Preferably, the beam member comprises a fabricated structure including a centre bar attached at each end intermediate the ends of a boundary bar extending generally perpendicular thereto. A wheel may be attached adjacent each end of the boundary bars, preferably on an inner surface thereof.

The coupling means may comprise co-operating apertured flanges longitudinally spaced-apart on an outer surface of each boundary bar and on the stores carrying trolleys.

A ramp portion may be provided centrally the beam member.

Preferably, said trackway includes parallel, longitudinally extending slots and said guide means includes at least one tongue member projecting downwardly from the beam member and adapted during operation for location in each of the slots.

Braking means may be provided to selectively arrest movement of the beam member and, in apparatus having a slotted trackway may, conveniently, comprise at least one hydraulic piston carried by the beam member and operative to grip surfaces of the slot.

Coupling means may be provided for attaching said beam member to a trolley of an aircraft moving apparatus adapted during operation to align an aircraft parallel to the trackway. Conveniently, the aircraft moving trolley moves along the same trackway as the beam member.

Power means may be provided to move the beam member along the trackway and an apparatus for operation with an aircraft moving trolley may include a cable attached to the beam member and routed over a pulley attached to the aircraft moving trolley for connection to a winch.

In a stores handling system according to the invention the the aircraft moving apparatus may comprise a trolley movable along the trackway and including guide means adapted in operation to guide the trolley along the trackway and power means to selectively move the trolley.

Coupling means may be provided to selectively attach the stores handling beam member to the aircraft moving trolley whereby the trolley and the beam member can be moved in combination along the trackway.

Various embodiments of the invention will now be described by way of example and with reference to the accompanying drawings in which:

FIG. 1 is a view in plan of a beam member forming part of stores handling apparatus in accordance with one embodiment of the invention;

FIG. 2 is a front elevation of the beam member shown in FIG. 1;

Figure 8:
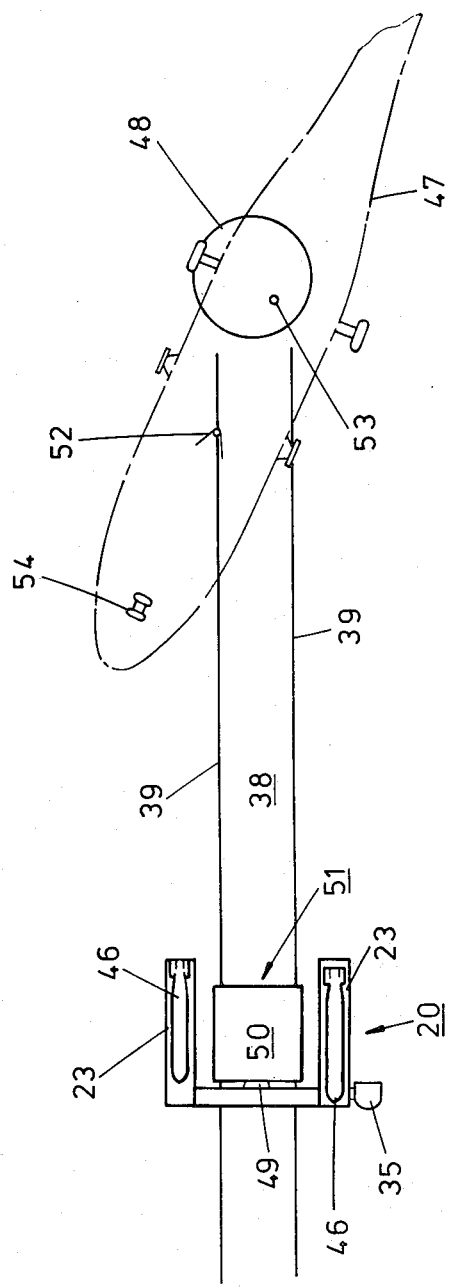
Figure 9:
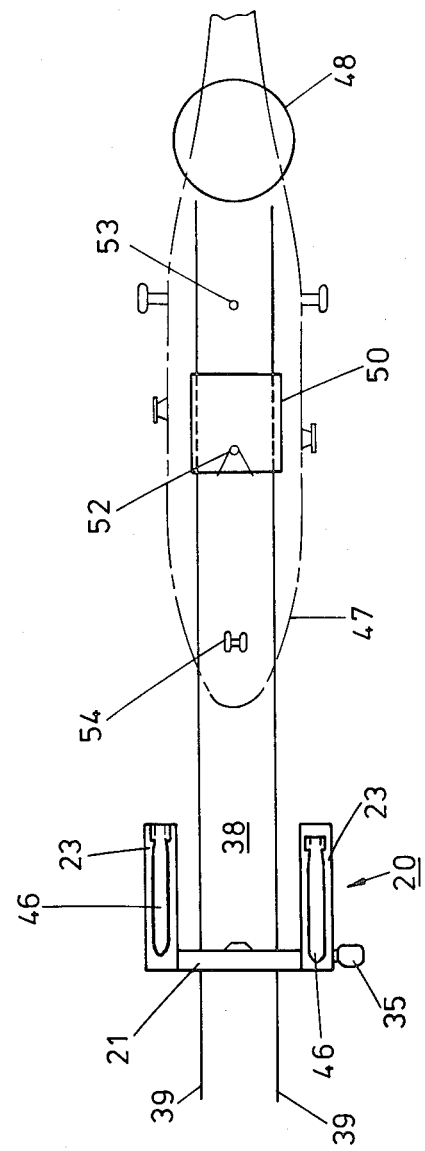
Figure 10:
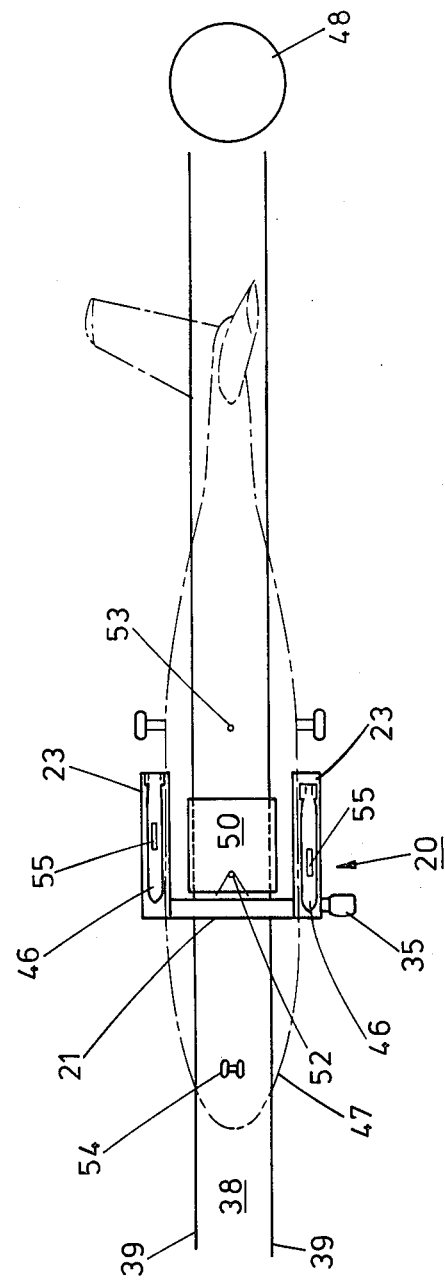
Figure 11:
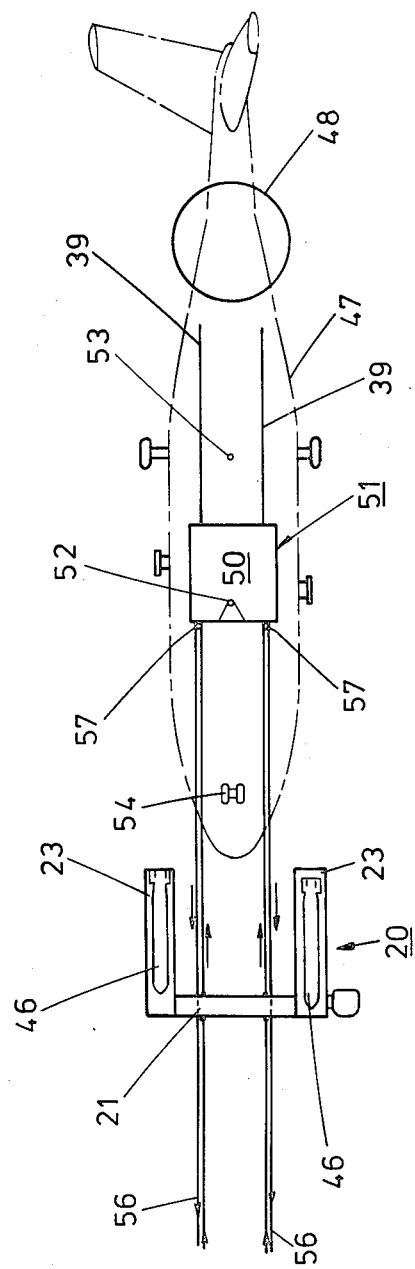
Figure 12:
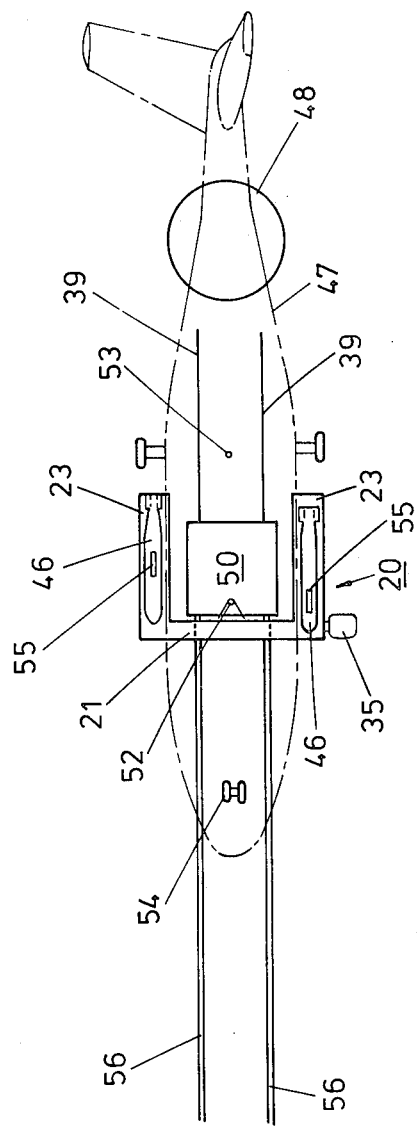

FIGS. 8 to 10 inclusive are schematic views in plan illustrating various stages in the movement and loading of externally mounted stores on a helicopter by a stores handling system including apparatus constructed in accordance with the invention, and FIGS. 11 and 12 are similar views to FIGS. 8 to 10 showing two stages in the operation of an alternative stores handling system.

Figure 3:
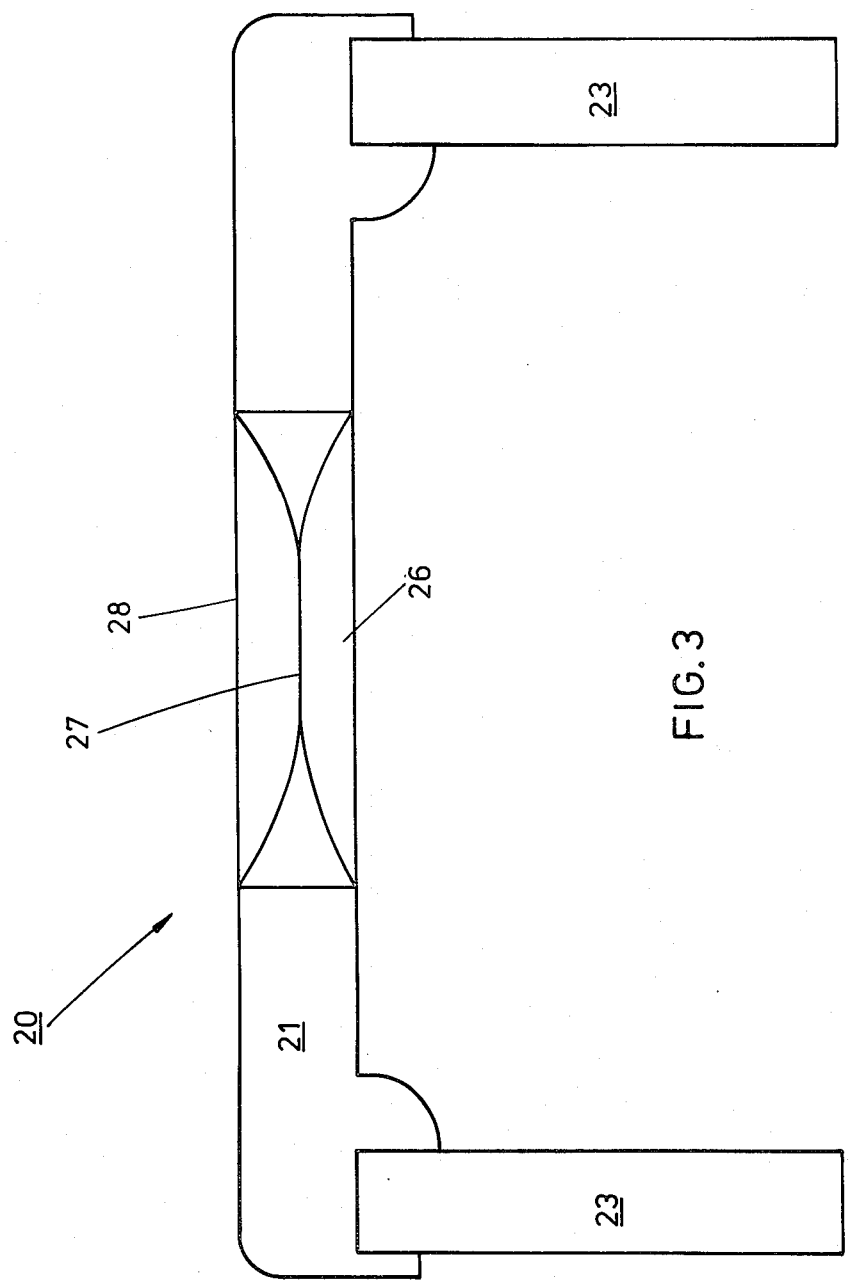
FIG. 3 is a view in plan of the beam member shown in FIGS. 1 and 2 and having stores carrying trolleys attached thereto.

Referring now to FIGS. 1 to 3, there is shown a beam member 21 comprising part of stores handling apparatus 20 for moving and positioning stores relative to an aircraft. The beam member 21, which may be of metal or composite materials construction, is provided with coupling means 22 for the attachment of stores carrying trolleys 23, as shown in FIG. 3, which project substantially perpendicular to the beam member. The beam member is supported on a surface, such as the deck of a ship, by ball supports 24 located on the undersurface of the beam member near to its ends and which facilitate movement of the beam member in any direction with respect to a surface on which it is supported. Guide means, in this embodiment two tongue members 25, project from the undersurface of the beam member 21. At its centre span 26 the beam member 21 tapers in transverse cross-section, the upper surface sloping downwardly from the centre 27 of the section to the side edges 28 thereof, so that the beam member is thickest at the centre 27 and thinnest at the side edges 28 of the transverse section. This section facilitates the passage of a nose wheel of an aircraft over the beam member 21 (when the stores handling apparatus 20 is being moved into position). Also, as can be seen in FIG. 2, the beam member 21 is of thinner section over the centre portion of its length, between the coupling means 22, so as to give it additional flexibility whereby it will be deflected downwardly towards the surface on which it is supported as the aircraft nose wheel rides over the beam.

Figure 4:
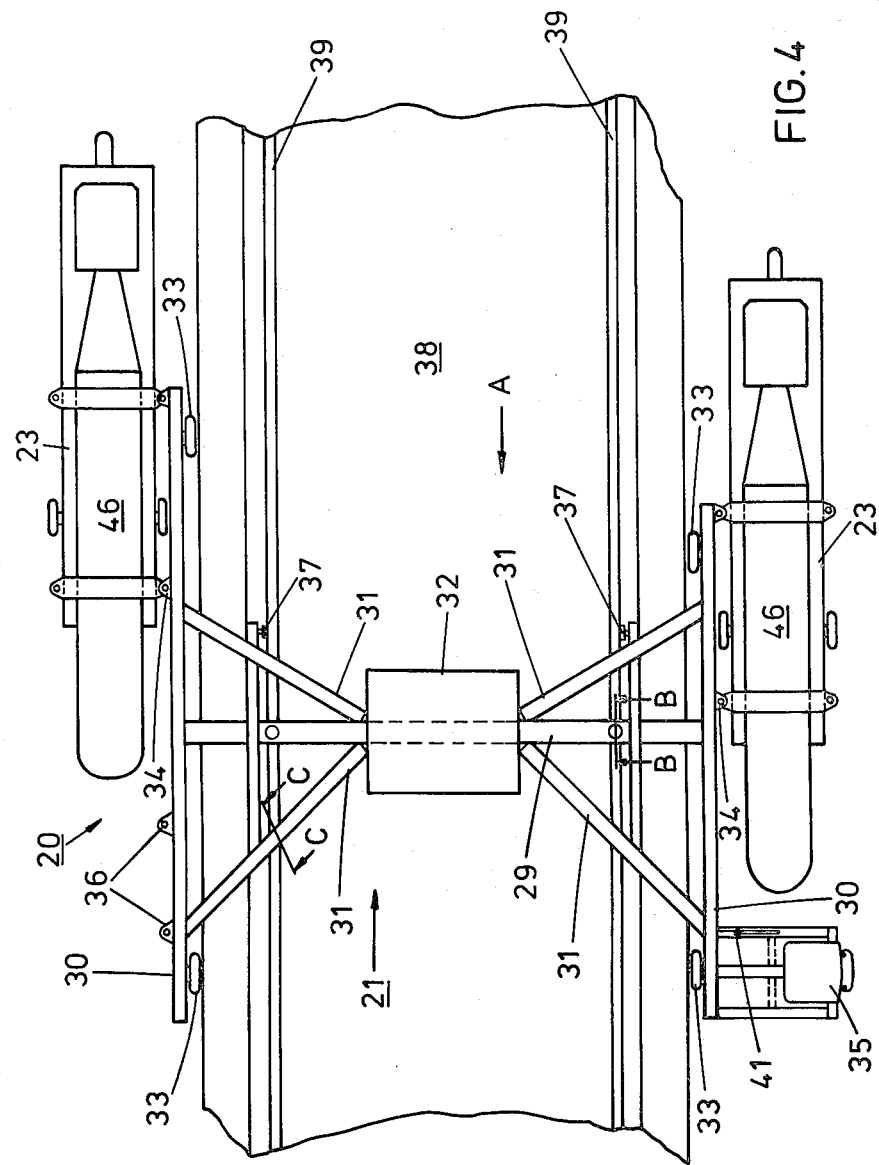
FIG. 4 is a plan view of a stores handling apparatus constructed in accordance with a preferred embodiment of the invention.
Figure 5:
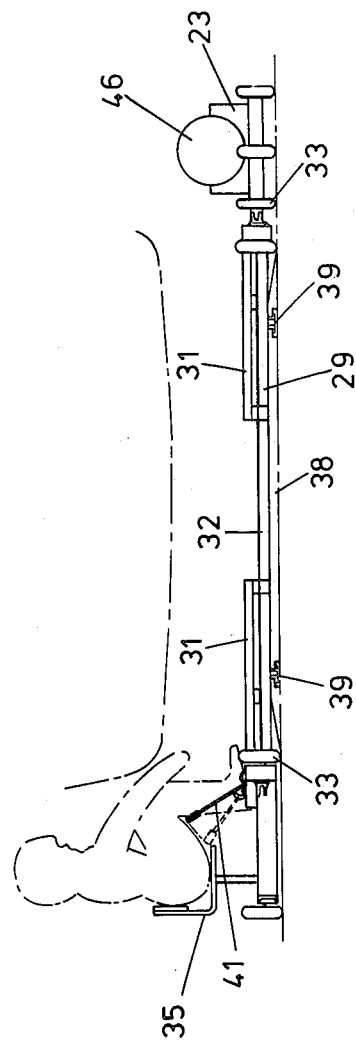
FIG. 5 is a side view of the embodiment of FIG. 4 taken in the direction of arrow A.

In a preferred embodiment illustrated in FIGS. 4 and 5, the beam member 21 of aircraft stores handling apparatus 20 comprises a fabricated structure constructed of welded metal bars of channel cross-section.

Each end of a centre bar 29 is attached intermediate the ends of a boundary bar 30 which extends perpendicular thereto. Angled strengthening bars 31 extend between the boundary bars 30 and the centre bar 29 and a ramp portion 32 is provided centrally of bar 29 for a purpose to be hereinafter described.

A pneumatic tyre wheel 33 is attached on an inner surface adjacent both ends of each boundary bar 30, and wheeled stores carrying trolleys 23 loaded with stores 46 are releasably attached to an outer surface thereof through co-operating apertured lugs 34 provided on the bars 31 and the trolleys 23. It will be noted that, as in the previous embodiment, the stores carrying trolleys 23 extend perpendicular to the beam member 21.

An operator's seat 35 is provided adjacent one end of one of the boundary bars 30 and apertured lugs 36 are provided on an outer surface adjacent one end of the other bar 30 for the releasable attachment of other desired equipment, for example a sono-buoy trolley adapted to carry a desired number of buoys depending on the requirements of the aircraft being serviced.

Two attachment lugs 37 are provided on the beam member 21 for attaching the apparatus to other equipment during certain phases of operation as will be more fully described hereinafter.

The stores handling apparatus of this invention is intended to be operated in combination with a trackway formed on the deck of a ship and adapted to guide the apparatus along a predetermined path. The embodiment of FIGS. 4 and 5 is illustrated in combination with a preferred construction of trackway 38 comprising an upper surface raised from and substantially parallel to the deck surface, and provided with parallel longitudinally extending slots 39 having an inverted T-shape in cross-section.

Figure 7:
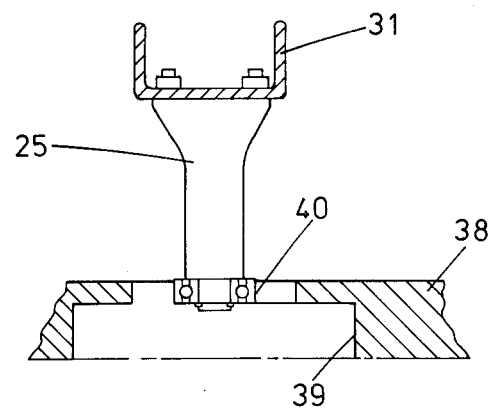
FIG. 7 is a part sectioned view of a detail feature of the embodiment of FIG. 4 and taken on lines C—C of FIG. 4.

As shown in FIG. 4, the beam member 21 is located transversely of the trackway 38 and is retained in this relative position during movement along the trackway by guide means located in the slots 39. Referring now to FIG. 7 which illustrates the arrangement at each location that a bar 31 crosses the slots 39, each guide means comprises a tongue member 25 projecting downwardly from each of the angled bars 31, the members 25 each supporting a ball bearing 40 at a lower end for engagement with walls of the T-shaped slots 39.

Hydraulic braking means are provided to selectively arrest movement of the apparatus 20 along the trackway 38. To this end a hand pump 41 is located adjacent the operator's seat 35 and is connected to two brake cylinders 42 carried by the centre bar 29 and positioned at the locations where the bar 29 crosses the T-shaped slots 39 in trackway 38.

Figure 6:
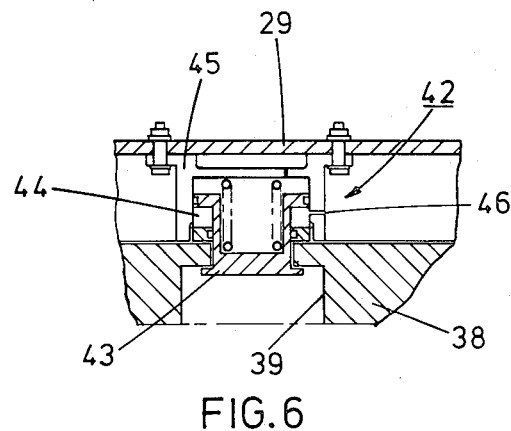
FIG. 6 is a sectioned view of a detail feature of the embodiment of FIG. 4 and taken on lines B—B of FIG. 4.

Referring now to FIG. 6, each brake cylinder 42 comprises a spring-loaded piston 43 shaped to define a chamber 44 in combination with the bore of a housing 45 carried by bar 29. The chamber 44 is connected to the hand pump 41 so that pressurised hydraulic fluid entering chamber 44 through connection 46 causes movement of the piston 43 against the force of the spring, thereby gripping the walls of the T-shaped slot 39. Release of the pressure from chamber 44 serves to release the braking effect due to movement of the piston 43 under the action of the spring.

In an unillustrated embodiment, power means are provided to move the apparatus 20 along the trackway 38. Conveniently, the power means may comprise remote winch means coupled to the apparatus 20 through cables routed along the T-shaped slots 39.

In operation of the stores handling apparatus constructed in accordance with the invention, it will be apparent that it is necessary that the aircraft be correctly aligned with the deck guide means. Many different types of aircraft moving apparatus have been proposed and may be adapted for this purpose. However, a preferred apparatus comprises a trolley movable along a trackway like the trackway 38 of the embodiment of FIGS. 4 and 5 of this invention. The aircraft moving trolley includes an extendible probe adapted to grip and retain an aircraft on the deck, and is constructed so that movement of the trolley along the trackway serves to automatically align the longitudinal centreline of the aircraft fuselage parallel to the trackway. Such an apparatus is particularly advantageous when used in conjunction with a so-called harpoon deck-lock system.

Thus, whilst it is to be understood that the stores handling apparatus of this invention is not limited to use with any particular aircraft moving apparatus, for convenience the operation will now be described with reference to FIGS. 8 to 10 inclusive in combination with an aircraft moving apparatus of the above-described form.

In FIG. 8 an aircraft, in this case a helicopter 47, is shown locked to a deck-lock grid 48 of a deck-lock system. A trackway 38 having two parallel slots 39 as described in connection with FIGS. 4 to 7 is provided on the deck surface and extends from a hangar (not shown) to the deck-lock grid 48. Stores handling apparatus 20 constructed as described with reference to FIGS. 1 to 3 and loaded with stores 46 is illustrated attached by a coupling 49 to a powered trolley 50 comprising part of an aircraft moving apparatus 51. However, if the stores handling apparatus is of the construction illustrated in FIG. 4, the attachment lugs 37 provide for attachment of the beam member 21 to the trolley 50. Movement of the powered trolley 50 along trackway 38 serves, therefore, to move the apparatus 20 to the position illustrated in FIG. 8, at which position the stores handling apparatus 20 is locked to the trackway 38 by locking means (not shown), and the trolley 50 is de-coupled therefrom. The trolley 50 is then moved along the trackway 38 to the underside of the helicopter 47 and a vertically extendible probe (not shown) on the trolley 50 is extended to engage with locking means 52 mounted on the underside of the helicopter 47.

The helicopter 47 is then positioned by movement of the trolley 50 so that the longitudinal centreline of the helicopter is aligned parallel with the trackway 38, and a harpoon member 53 on the underside of the helicopter by which it is locked to the grid 48 is released. The helicopter 47 is then moved by movement of the trolley 50 along the trackway 38 towards the stores handling apparatus 20 (FIG. 9), and, when the helicopter 47 comes up to the beam member 21 of the stores handling apparatus 20, its nose wheel 54 rides over the beam member 21 and the trolley 50 moves into a position where it is again coupled with the beam member 21 by the coupling 49 or the lugs 37 as the case may be. If the beam member 21 is of the construction shown in FIG. 4, the ramp portion 32 provides for passage of the nose wheel 54 over the beam member 21. With the stores handling apparatus 20 so positioned with respect to the helicopter 47, as shown in FIG. 10, the weapons 46 on the stores carrying trolleys 23 are accurately located beneath stores mounting devices 55 on the helicopter 47. The weapons 46 are then offered up to the stores mounting devices 55, preferably using lifting means on the trolleys 23 for attachment to the devices 55 by an armament fitter seated on the seat 35.

The trolley 50 is then de-coupled from the beam member 21 and the helicopter 47 armed with the weapons 46 is moved back along to the trackway 38 into position over the deck-lock grid 48 and the harpoon member 53 is re-engaged in locking relationship with the deck-lock grid 48.

With the helicopter locked to the deck by the deck-lock system, the trolley 50 is moved back along the trackway 38 to pick up the stores handling apparatus 20 which is then moved by the trolley 50 back into the hangar (not shown) and the helicopter 47 is ready for take-off.

In an alternative system, illustrated in FIGS. 11 and 12, the trolley 50 of the aircraft moving apparatus 51 is first moved along the trackway 38 to the underside of the helicopter 47 at the deck-lock grid 48, and engages with the helicopter and moves it into a position where it is aligned with the trackway 38 (FIG. 11). The stores handling apparatus 20 is then winched from the hangar (not shown) by cables 56 running around pulley wheels 57 mounted on the trolley 50 into a position with respect to the helicopter 47 where the weapons 46 are accurately aligned with the stores carrying devices 55 on the helicopter (FIG. 12). After the weapons have been secured to the helicopter, the stores handling apparatus 20 is winched back into the hangar and the trolley 50 returns the helicopter 47 to the deck-lock grid 48 where it is locked ready for take-off when the trolley 50 has been withdrawn. The modified system of FIGS. 11 and 12 has the advantage of requiring a shorter deck length for carrying out the loading operation than is required for operation of the system shown in and described with reference to FIGS. 8 to 10 inclusive.

Thus, the stores handling apparatus provides for the accurate and positive location of stores beneath external mounting means on an aircraft and is, therefore, particularly advantageous in carrying out such an operation in the often hazardous environment on a ship's deck. In the illustrated embodiments only one operator is required on deck during the stores loading operation, and it will be noted that such an operator need not venture from the comparative safety of a fixed seat on the apparatus.

Alternatively, the apparatus of this invention can be operated with no personnel on the deck by arranging for the lock and the lifting of the stores on to the aircraft to be controlled from a remote location protected from the environment.

When used in combination with suitable aircraft moving apparatus, especially apparatus that shares a common guide means such as a trackway with the stores handling apparatus of this invention, the combination provides an extremely efficient stores and aircraft handling system that is particularly suited for installation on the deck of a ship.

Whilst several embodiments have been described and illustrated it will be apparent that many modifications can be made without departing from the scope of the invention as defined in the appended claims. For example, power means such as a motorised wheel or a rack and pinion mechanism can be provided on the apparatus to move the apparatus along the trackway. Depending on the requirements of a particular aircraft, additional trolleys 23 can be releasably attached alongside the trolleys of the described embodiments, and parallel therewith.

I claim as my invention:

1. Stores handling apparatus for moving and positioning stores relative an aircraft on the deck of a ship, wherein said apparatus comprises a trackway on the deck and closely adjacent to the deck, a beam member located transversely of said trackway which is movable longitudinally beneath an aircraft fuselage, means for moving said beam member along the trackway, releasable coupling means adjacent each end of the beam member for the attachement of at least one stores carrying trolley whereby each said trolley projects substantially horizontal and perpendicular to the beam member, and guide means adapted in operation to guide the beam member along the trackway.

2. Apparatus as claimed in claim 1, wherein said beam member comprises a fabricated structure including a centre bar attached at each end intermediate the ends of a boundary bar extending generally perpendicular thereto.

3. Apparatus as claimed in claim 2, wherein a wheel is attached adjacent the ends of each boundary bar and on an inner surface thereof.

4. Apparatus as claimed in claim 2, wherein said coupling means comprise co-operating apertured flanges longitudinally spaced-apart on an outer surface of each boundary bar and on said stores carrying trolleys.

5. Apparatus as claimed in claim 1, wherein a ramp portion is provided centrally of either side of said beam member over which an aircraft undercarriage wheel passes.

6. Apparatus as claimed in claim 1, wherein power means are provided to selectively move said beam member along the surface.

7. Apparatus as claimed in claim 1, wherein said trackway includes parallel, longitudinally extending slots.

8. Apparatus as claimed in claim 7, wherein said guide means comprise at least one tongue member projecting downwardly from said beam member and adapted during operation for location in each of said slots.

9. Apparatus as claimed in claim 1, wherein braking means are provided to selectively arrest movement of said beam member along the trackway.

10. Apparatus as claimed in claim 1 wherein said moving means includes a coupling means for attaching said beam member to a trolley of an aircraft moving apparatus, said aircraft moving trolley being adapted during operation to align an aircraft parallel to said trackway.

11. Apparatus as claimed in claim 10, wherein said aircraft moving trolley operates along the same trackway as the beam member.

12. Apparatus as claimed in claim 10 and including power means adapted to move said beam member along said trackway.

13. Apparatus as claimed in claim 1, and including aircraft moving apparatus comprising a trolley operable along the trackway and adapted to align an aircraft parallel to the trackway, and wherein said moving means includes a cable attached to said beam member and routed over a pulley attached to said aircraft moving trolley for connection to a winch.

14. Stores handling apparatus for moving and positioning stores relative an aircraft on the deck of a ship, wherein said apparatus comprises a trackway on the deck and closely adjacent to the deck, the trackway including parallel longitudinally extending slots, a beam member located transversely of the trackway which is movable longitudinally beneath the aircraft fuselage, means for moving said beam member along the trackway, releasable coupling means adjacent, each end of the beam member for the attachement of at least one stores carrying trolley whereby each said trolley projects substantially horizontal and perpendicular to the beam member, guide means adapted in operation to guide the beam member along the trackway and braking means selectively operable to arrest movement of the beam member along the trackway.

15. Apparatus as claimed in claim 14, wherein said braking means comprises at least one hydraulic piston carried by said beam member and operative to grip surfaces of said slot.

16. A stores handling system for moving and positioning stores relative an aircraft parked on the deck of a ship comprising stores handling apparatus and aircraft moving apparatus, said aircraft moving apparatus being adapted during operation to align said aircraft so that a longitudinal centreline thereof is parallel to a trackway which is on the deck and which is closely adjacent the deck, wherein said stores handling apparatus comprises a beam member located transversely of said trackway which is movable longitudinally beneath the aircraft fuselage, means for moving said beam member along the trackway, releasable coupling means adjacent each end of the beam member for the attachment of at least one stores carrying trolley whereby each said trolley projects substantially horizontal and perpendicular to the beam member, and guide means adapted in operation to guide the beam member along the trackway.

17. A stores handling system as claimed in claim 16, wherein said aircraft moving apparatus comprises a trolley movable along said trackway and including guide means adapted in operation to guide said trolley along the trackway, and power means to selectively move said trolley.

18. A stores handling system as claimed in claim 17 and including coupling means to selectively attach said stores handling beam member to said aircraft moving trolley whereby said trolley and said beam member can be moved in combination along said trackway.

19. A stores handling system as claimed in claim 17, wherein power means are provided to selectively move said beam member along said trackway.

20. A stores handling system as claimed in claim 19, wherein said power means comprise at least one cable attached to said beam member and routed around a pulley on said aircraft moving trolley for connection to a winch means.

* * * * *